May 7, 1935. J. VOTYPKA 2,000,626
VEHICLE BODY AND TOP CONSTRUCTION
Filed April 28, 1930 4 Sheets-Sheet 1
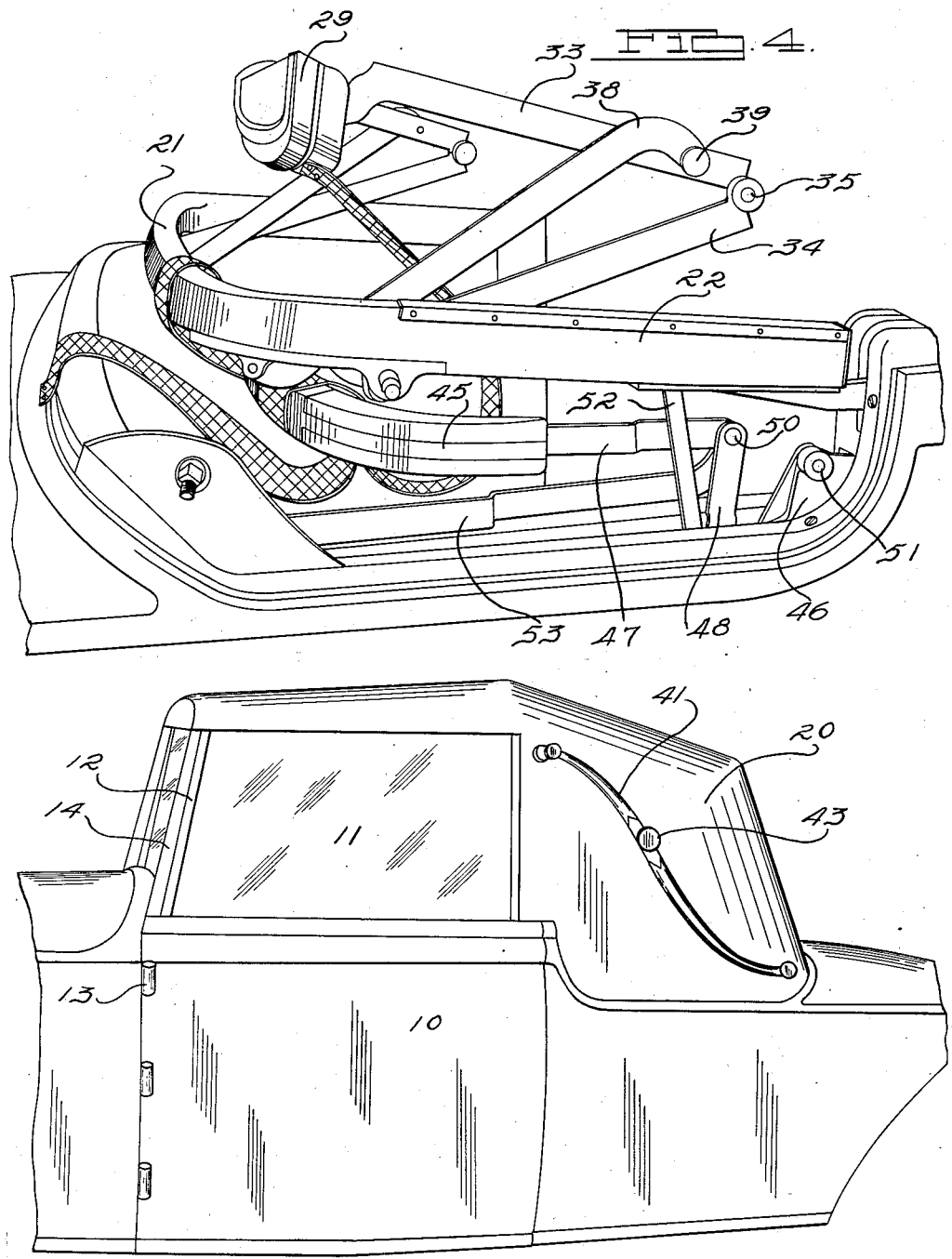
INVENTOR
John Votypka.
BY
ATTORNEY May 7, 1935. J. VOTYPKA 2,000,626
VEHICLE BODY AND TOP CONSTRUCTION
Filed April 28, 1930 4 Sheets-Sheet 2
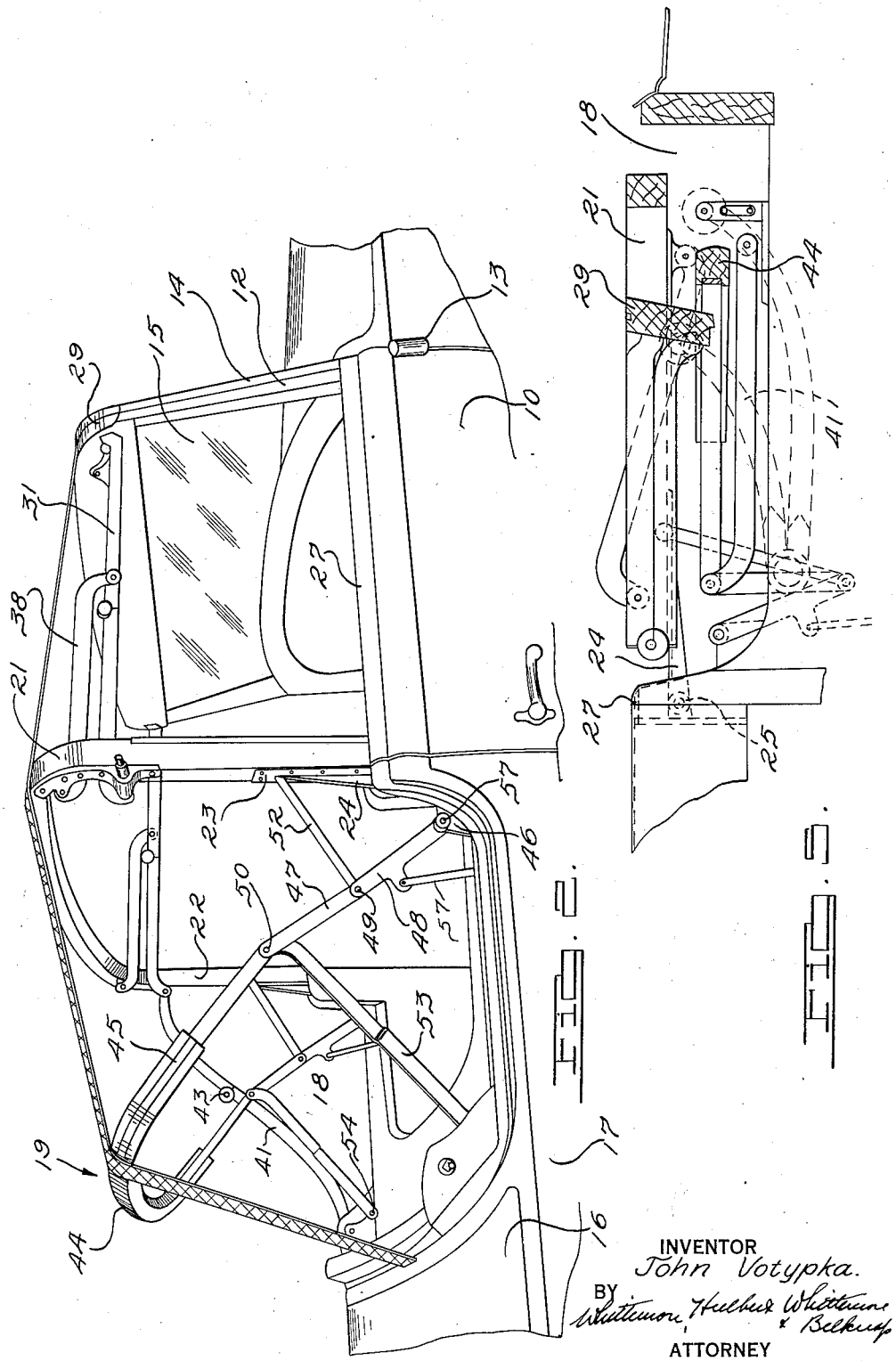
INVENTOR
John Votypka.
BY
ATTORNEY May 7, 1935. J. VOTYPKA 2,000,626
VEHICLE BODY AND TOP CONSTRUCTION
Filed April 28, 1930 4 Sheets-Sheet 3
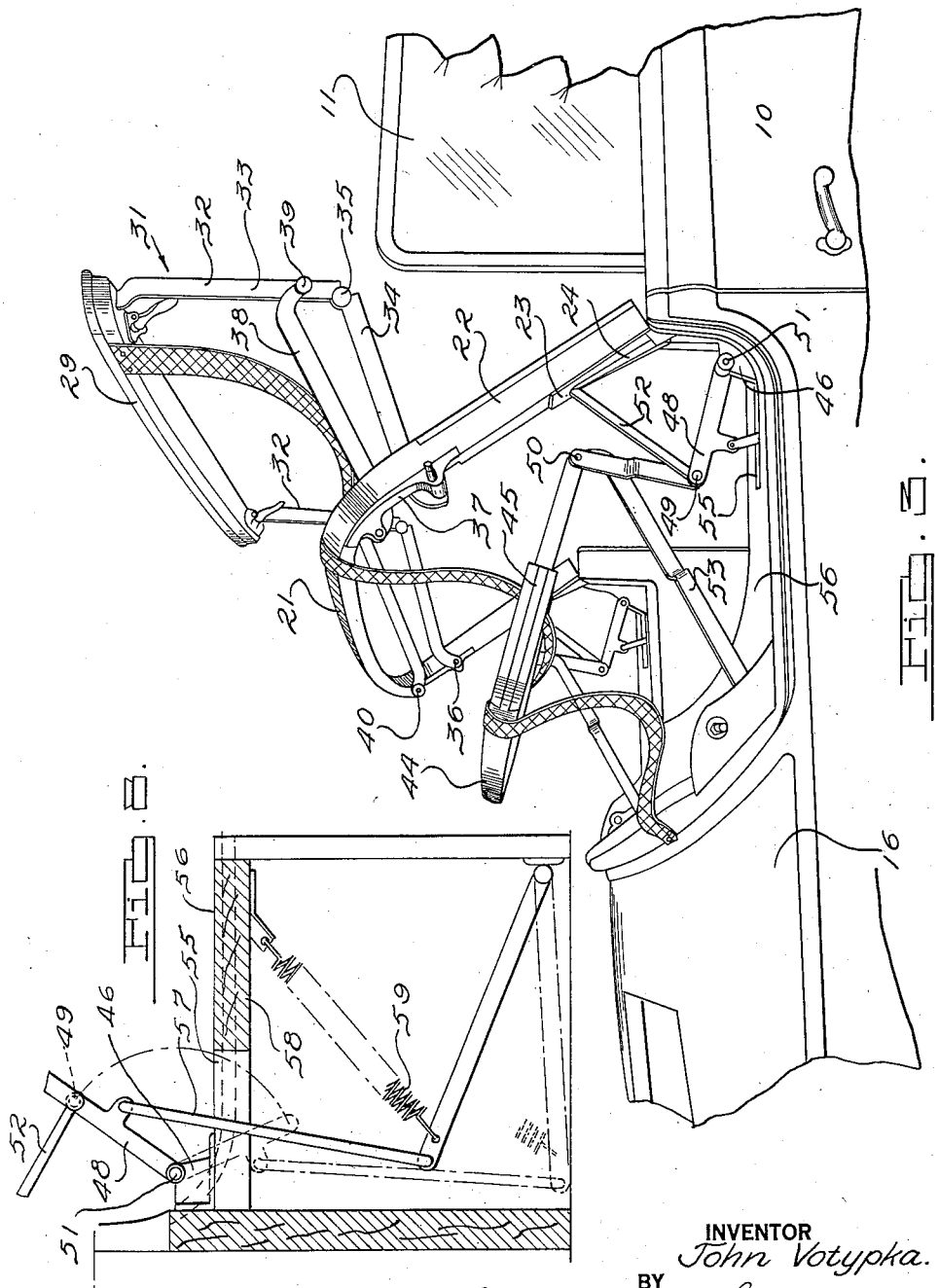
INVENTOR
John Votypka.
BY
ATTORNEY May 7, 1935.     J. VOTYPKA     2,000,626
VEHICLE BODY AND TOP CONSTRUCTION
Filed April 28, 1930     4 Sheets-Sheet 4
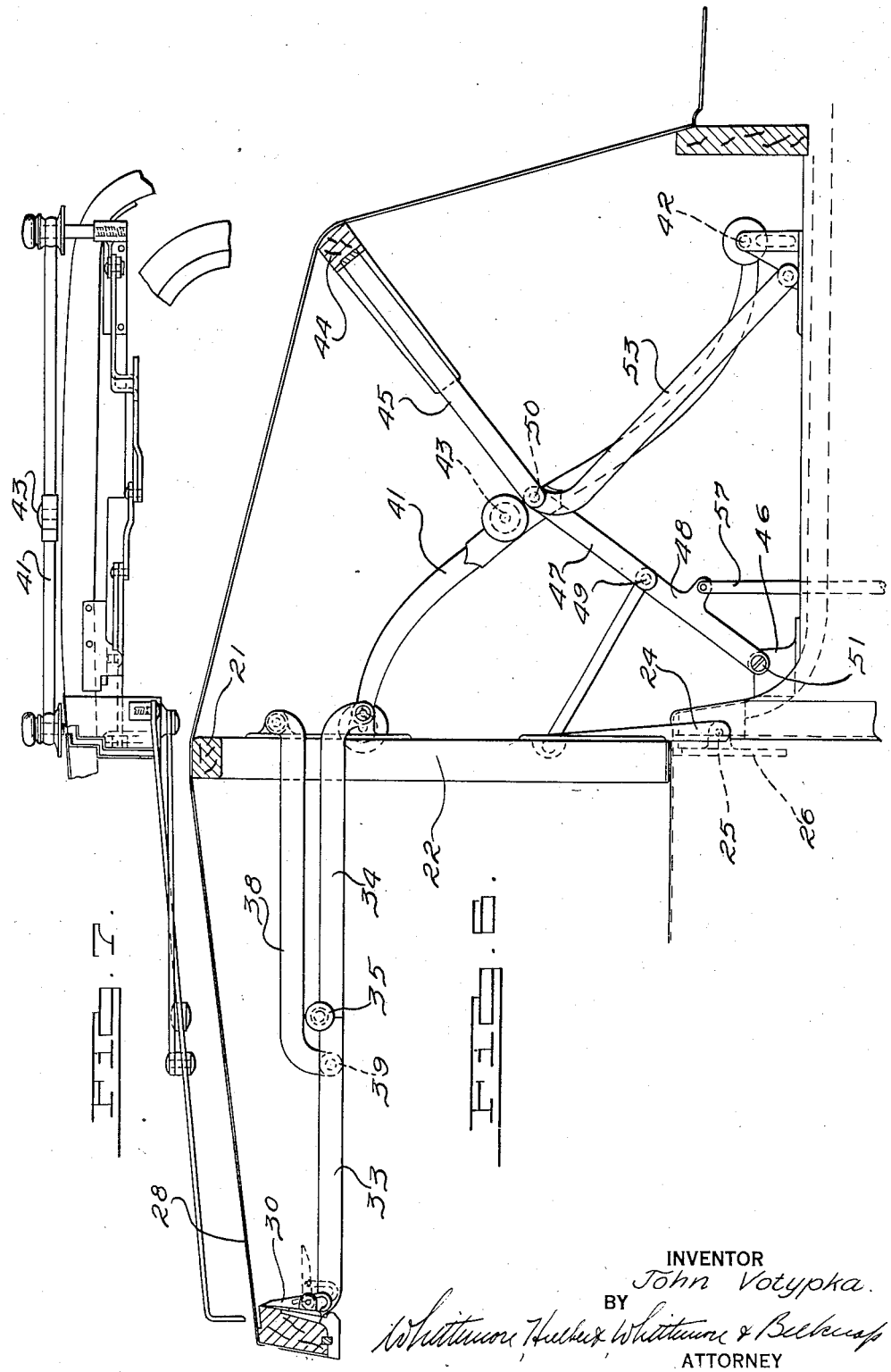
INVENTOR
*John Votypka.*
BY
ATTORNEY Patented May 7, 1935

2,000,626

UNITED STATES PATENT OFFICE 2,000,626

VEHICLE BODY AND TOP CONSTRUCTION

John Votypka, Detroit, Mich., assignor to Lebaron Detroit Company, Detroit, Mich., a corporation of Michigan Application April 28, 1930, Serial No. 448,015

1 Claim. (Cl. 296—107)

This invention relates to vehicle bodies and has particular reference to closed bodies of the convertible type wherein the super-structure of the body and top supported thereby is capable of being collapsed to permit the vehicle to assume the appearance of an open car.

While convertible automobile bodies of the type specified above have achieved considerable recognition in the trade due to the fact that they afford the advantages of both open and closed types of bodies, nevertheless, difficulty has been experienced in providing a top assembly which when collapsed affords a clear line of vision in rear of the vehicle and at the same time gives the vehicle the trim appearance of a touring car or roadster. This is especially true in the manufacture of convertible coupes or cabriolets wherein the rear deck is of such design as to restrict lowering of the top below the line of vision in rear of the vehicle.

The present invention contemplates eliminating the above objections by providing first, an improved collapsible top assembly capable of being more compactly folded in a comparatively smaller area of space than has heretofore been considered possible and second, by cutting away the rear side panels of the body and also the rear deck to form a recess of sufficient dimension to completely receive the top construction when the latter is collapsed. The above arrangement is such that when the top is collapsed, the same will not detract from the stream-line appearance of the vehicle and the occupants of the latter will be afforded a clear line of vision in rear of the vehicle.

A further advantageous feature of this invention is to provide an arrangement of the type specified above wherein the top, when in its upright position, completely conceals the recess in the rear deck and rear side panels of the body.

With the foregoing as well as other objects in view the invention resides in the peculiar construction of the top and body which will be made more apparent as this description proceeds, especially when considered in connection with the accompanying drawings, wherein:

Figure 1 is a fragmentary perspective view of a convertible automobile body and top assembly constructed in accordance with this invention.

Figure 2 is a perspective view of the body with the top covering removed to illustrate the frame structure of the top.

Figure 3 is a view similar to Figure 2 illustrating the relative positions of the parts of the top assembly when the latter is partially collapsed.

Figure 4 is a view similar to Figure 3 showing the top collapsed to a greater extent.

Figure 5 is a side elevational view partly in section illustrating the top in collapsed position.

Figure 6 is a side elevational view partly in section showing the relative positions of the parts of the top when the same is in its upright position.

Figure 7 is a fragmentary top plan view of the construction shown in Figure 6.

Figure 8 is a fragmentary side elevational view partly in section of a portion of the top construction.

For the purpose of illustration I have shown my invention as applied to a vehicle body commonly known in the trade as a cabriolet or convertible coupe. As shown, the body comprises the conventional side doors 10 adapted to house the usual slidable glass panels 11 and having front pillars 12 hingedly connected as at 13 to the front body pillars 14. The pillars 14 may be of any suitable construction and preferably form a support for the conventional windshield 15. The rear deck 16 and rear side panels 17 of the body are cut away to provide a recess 18 of sufficient dimension to completely receive the collapsible top 19 when the latter is in folded position as illustrated in Figure 5 of the drawings.

The top 19 of the vehicle is so constructed and assembled upon the body that when the same is in its upright position, as illustrated in Figure 1, the recess 18 is completely concealed by the hood portion 20 of the top. In detail, the top comprises a main substantially U-shaped supporting bow 21 extending transversely of the body and having the leg portions 22 pivoted to opposite sides of the body in a manner to be presently described. In the upright or normal position of the top 19 the bow 21 is arranged in a substantially vertical plane as illustrated in Figure 2 and forms a support and guide for the glass panels 15. Referring now to the manner in which the bowl 21 is hingedly connected to the body, it will be noted from Figures 2, 5 and 6 that I provide a pair of brackets 23 secured to the rear surfaces of the leg portions 22 and having portions 24 projecting beyond the leg portions 22 into the space between the side body panels and the interior finishing panels of the vehicle. The projecting portions 24 are pivotally connected as at 25 to suitable brackets 26 secured to the body in the space between the outer and inner panels aforesaid of the body. The pivotal points 25 for the bow 21 are located a sufficient distance below the upper edge portions 27 of the doors 10 to permit the bow 21 to assume a position within the recess 18 substantially flush with the edges 27 of the door panels when the top is collapsed as shown in Figure 5.

The forward section 28 of the top is carried by a header 29 extending transversely of the body and longitudinally of the windshield and arranged to seat upon the upper edge of the latter when the top is in its upright position. The header 29 is detachably secured to the upper bar of the windshield frame by means of suitable fastening devices 30 and is connected at the opposite ends thereof with the main supporting bow 21 by means of a sectional frame 31. The frame 31 comprises side bars 32 extending between the header and bow 21. Each of the side bars 32 are formed of a pair of links 33 and 34 having the inner ends pivotally connected together as at 35 and having the outer ends thereof respectively connected to the header 29 and bow 21. As shown in Figure 3, the outer ends of the links 34 are pivotally secured as at 36 to suitable brackets 37 fastened to the rear surface of the U-shaped bow 21 adjacent the base portion thereof. In order to brace the frame 31 when the top is in its upright position, I provide a pair of bars 38 having the forward ends thereof pivotally connected as at 39 to the links 33 adjacent the pivotal connection between the latter links and links 34. The rear ends of the bars 38 on the other hand are pivotally connected to the bracket 37 as at 40 above the pivotal connection 36 between the links 34 and bracket. The arrangement is such that when the frame 31 is in its extended position, as shown in Figure 2, the bars 38 tend to resist collapsing of the frame 31. The bow 21 is held in the position shown in Figure 2 by means of the conventional top brace members 41 having their upper ends pivotally connected to the brackets 37 on the bow 21 and the lower ends thereof pivotally connected to the vehicle body as at 42. Each of the brace members 41 are formed of a pair of sections pivotally connected together as at 43 to permit breaking of the brace members when it is desired to collapse the top.

Thus, from the foregoing it will be apparent that I have provided a connection between the main supporting bow 21 and header 29 collapsible upon folding the top to locate the side bars 33 and 34 together with the header 29 within the boundaries of the main supporting bow 21, as clearly shown in Figure 5 of the drawings. In operation, assuming that the top is in its upright position, as shown in Figure 2, and it is desired to collapse the same, the fasteners 30 are manipulated to detach the header 29 from the windshield frame and a downward force is exerted upon the side bars 31 of the frame causing the same to break at the points 35. When this is accomplished, the side bars 31 and header 29 may be moved to the position illustrated in Figure 5 within the boundaries of the supporting bow 21 and as a consequence does not add to the thickness of the fold when the top is collapsed.

Referring now more in detail to the manner in which the rear or hood portion 20 of the top is collapsed and with special reference to Figure 2 of the drawings, it will be noted that I provide a second substantially inverted U-shaped supporting bow 44 defining a space of substantially greater area than the area defined by the bow 21 and the recess 18. The bow 44 is formed with collapsible leg portions 45 having the ends thereof pivotally connected to suitable brackets 46 secured upon opposite sides of the vehicle adjacent the brackets 26. Each of the legs 45 of the U are formed of a pair of links 47 and 48 having their inner ends pivotally connected together as at 49 and having their outer ends respectively pivotally connected to the bow 19 as at 50 and to the bracket 46 as at 51. The links 47 and 48 permit the bow 44 to collapse upon folding the top and are of such a length to locate the bow 44 entirely within the recess 18.

In order to permit collapsing of the bow 44 upon movement of the bow 21 from its upright position and to guide the bow 44 into the space 18 upon folding the top, I provide a pair of links 52 having their forward ends pivotally connected to the bracket 23 and the rear ends pivotally secured to the connection 49 between the inner ends of the links 47 and 48. For assisting the links 52 in their function I provide a second pair of levers 53 having the rear ends thereof pivotally connected to the body as at 54 and having the forward ends pivotally secured to the connection 50 between the links 47 and bow 44. The arrangement is such that upon rearward movement of the bow 21 about the pivots 25, the levers 52 and 53 will exert a force upon the pivotal connections 49 and 50 in opposite directions causing the bow 44 to collapse and to assume a position within the recess 18 below the bow 21 as shown in Figure 5 of the drawings. As will be observed from this latter figure suitable slots 55 are provided within the top supporting shelf 56 of the body permitting the inner end portions of the links 47 and 48 to assume a position between the inner and outer side panels of the bow when the top is collapsed. While it has been stated above that the links 52 and 53 cooperate to assist in collapsing the bow 44 and guiding the same within the recess, it is to be noted that these links further function to brace the bow 44 when the top is in its upright position as will be obvious from Figure 2 of the drawings.

In Figure 8 of the drawings I have illustrated additional means for materially assisting movement of the bows 21 and 44 to the positions illustrated in Figures 1 and 2. As shown, this means comprises a pair of plungers 57 pivotally connected at the upper ends thereof to the links 48 intermediate the pivotal points 49 and 51 thereof and having the lower ends extending through the slots 55 and yieldably secured to the frame members 58 of the body by means of the springs 59. As will be apparent from Figure 8 the springs 59 are compressed when the top is in its collapsed position and normally exert an upward force upon the legs of the bow 44 adjacent the connections of the said legs with the body with the result that the springs 59 and accompanying parts facilitate raising the top. The foregoing construction is such that the springs 59 assist in moving the bow 44 to its uppermost position.

Thus, from the foregoing it will be observed that I have provided an improved construction of convertible body wherein the collapsible top is adapted to assume a position substantially below the side panels of the body when the top is in folded position thereby affording a clear line of vision in rear of the vehicle and greatly enhancing the general appearance of the vehicle.

While in describing the present invention particular stress has been placed upon the association of my improved body construction with a convertible coupe or cabriolet, it should be understood that the same may be utilized with equal facility in connection with numerous other types of bodies having collapsible tops and reservation is made to make such changes as may come within the purview of the accompanying claim.

What I claim as my invention is:

A collapsible top for vehicle bodies comprising a top supporting bow normally arranged in an upright position and having the ends of the vertical leg portions thereof pivotally connected to opposite sides of the body, a second top supporting bow also carried by the body and positioned rearwardly from the bow aforesaid, means connecting the second bow to opposite sides of the body including links having their adjacent ends pivotally connected together and having their opposite ends respectively pivotally connected to the free ends of the bow and to the body, said links normally being in alignment with the free end portions of the bow to form extensions of the latter and being of sufficient length to permit collapsing the bow into a space of substantially smaller area than the area normally defined by the bow and links, a lever having the rear end pivotally connected to the lowermost link forming a part of the second-mentioned bow and having the forward end pivotally connected to the first-mentioned bow, a second lever having the forward end pivotally connected to the link adjacent the lowermost link aforesaid and having the rear end thereof pivotally connected to the body whereby collapsing of the first-mentioned bow automatically effects a folding of the links forming a part of the second-mentioned bow.

JOHN VOTYPKA.